United States Patent [19]

Eusebe

[11] Patent Number: 5,570,919
[45] Date of Patent: Nov. 5, 1996

[54] REMOTE GRAPPLE

[76] Inventor: Frantz-Lee Eusebe, 20711 NW. Miami Pl., Miami, Fla. 33169

[21] Appl. No.: 494,841

[22] Filed: Jun. 26, 1995

[51] Int. Cl.$^6$ .......................................................... B25J 1/00
[52] U.S. Cl. ................................................ 294/19.1; 294/111
[58] Field of Search ................... 294/1.4, 11, 19.1–19.3, 294/22, 24, 50.7–50.9, 100, 111, 115; 56/332, 333; 81/53.11, 53.12

[56] References Cited

U.S. PATENT DOCUMENTS

| | | | |
|---|---|---|---|
| 394,550 | 12/1888 | Ansley et al. | 294/19.1 X |
| 925,212 | 6/1909 | McConville | 56/333 |
| 1,820,463 | 8/1931 | Klein | 294/11 |
| 2,429,884 | 10/1947 | Leigh | 294/111 |
| 2,616,741 | 11/1952 | Ziese | 294/19.1 |
| 2,803,484 | 8/1957 | Puckett | 294/19.1 X |
| 4,854,626 | 8/1989 | Duke | 294/19.1 |
| 5,154,465 | 10/1992 | Pakosh | 294/19.1 X |
| 5,317,939 | 6/1994 | Marinescu | 81/53.11 |

FOREIGN PATENT DOCUMENTS

| | | | |
|---|---|---|---|
| 566411 | 7/1960 | Belgium | 294/19.1 |
| 1369448 | 7/1964 | France | 294/19.1 |

*Primary Examiner*—Johnny D. Cherry

[57] ABSTRACT

A grapple for retrieving an object from a floor surface. The inventive device includes a handle tube having a fixed handle and a moving handle projecting therefrom. An engaging assembly extends from the handle tube and includes a plurality of fingers responsive to a movement of the moving handle to close about a bar of soap to retrieve the soap from a shower floor.

5 Claims, 3 Drawing Sheets

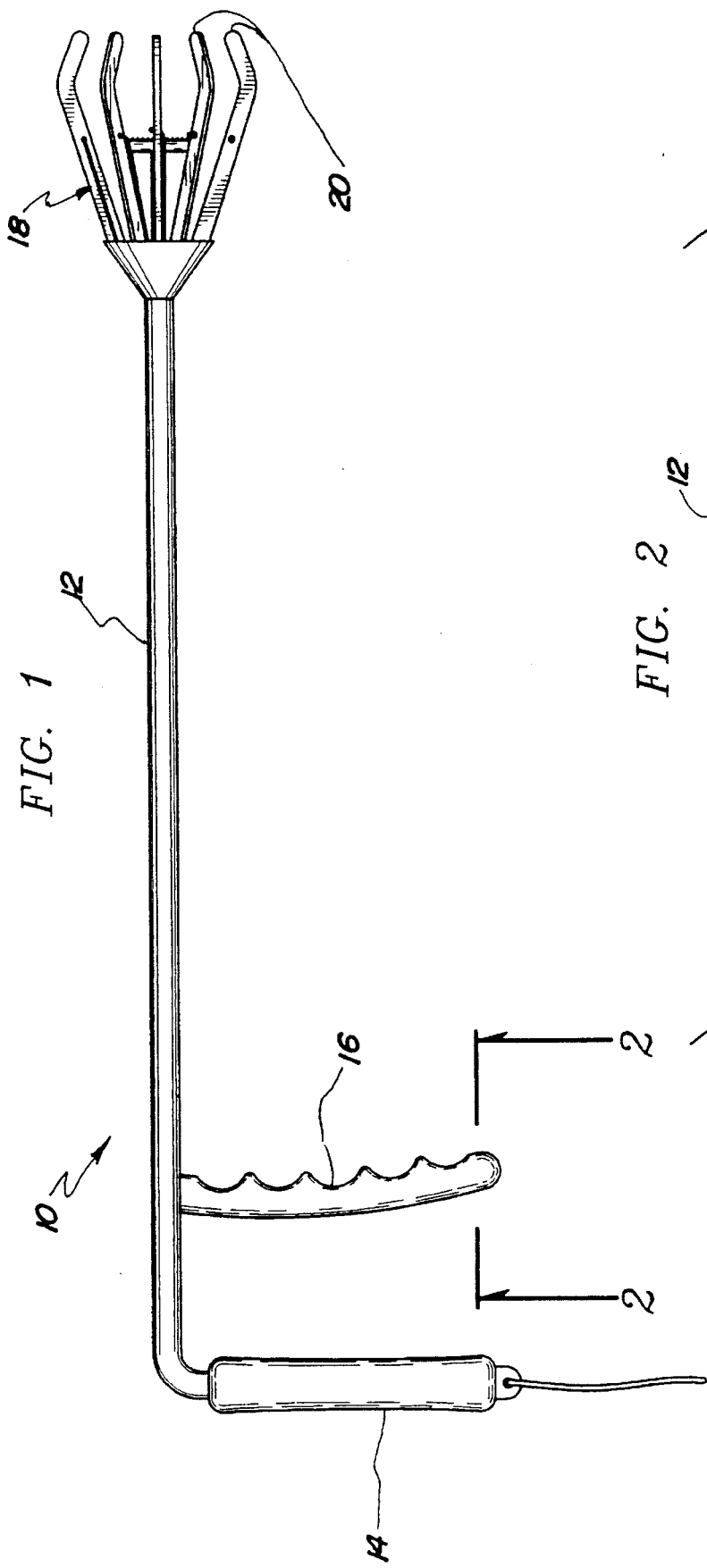
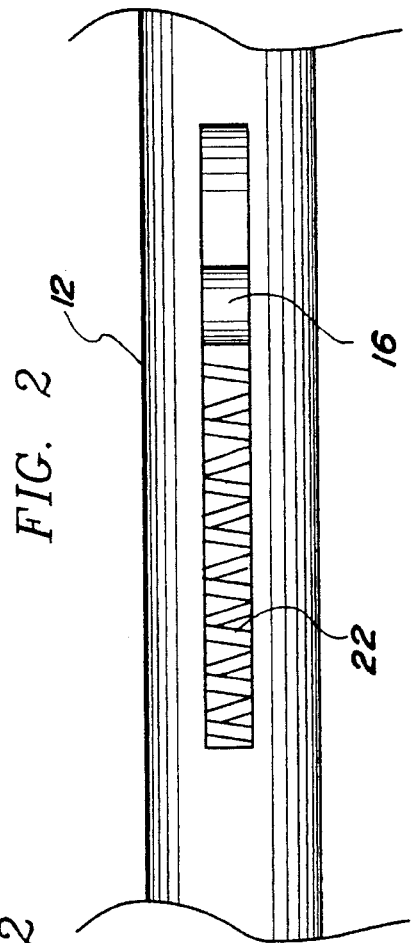

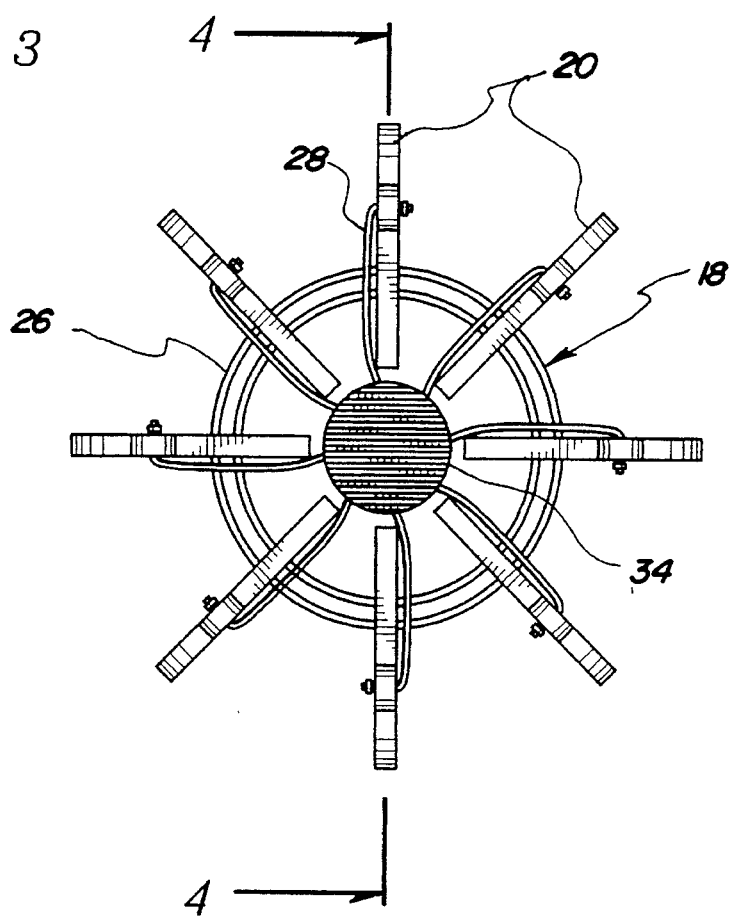
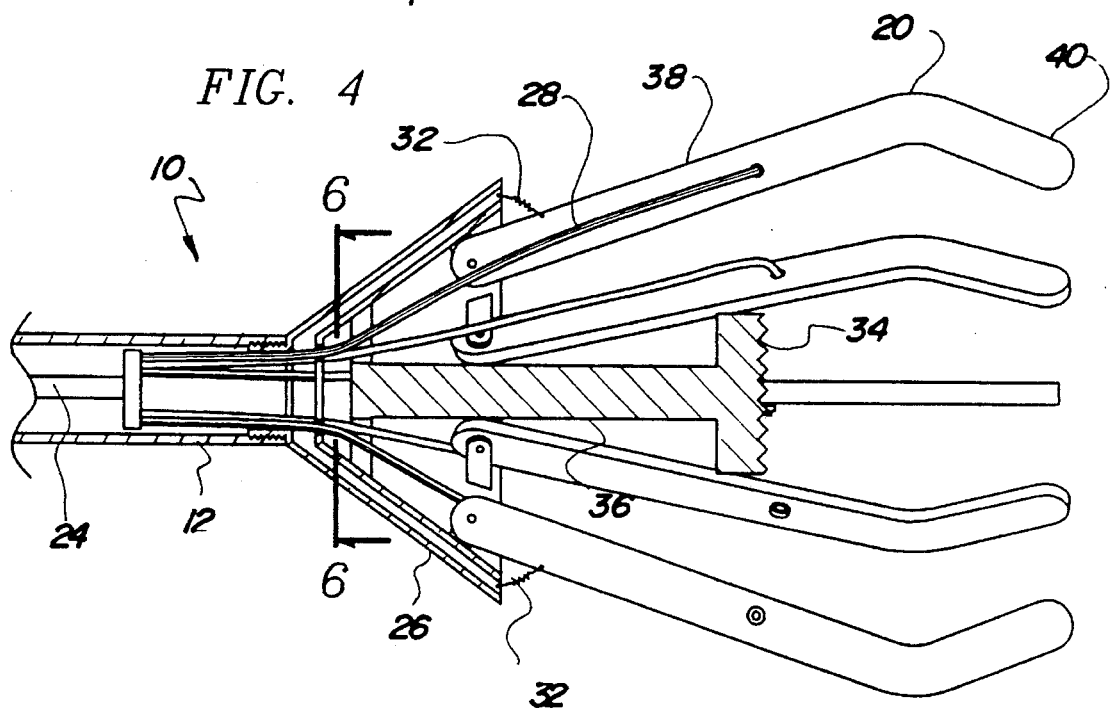

REMOTE GRAPPLE

BACKGROUND OF THE INVENTION

1. Field of the Invention

The present invention relates to handling implements and more particularly pertains to a remote grapple for retrieving an object from a floor surface.

2. Description of the Prior Art

The use of handling implements is known in the prior art. More specifically, handling implements heretofore devised and utilized are known to consist basically of familiar, expected and obvious structural configurations, notwithstanding the myriad of designs encompassed by the crowded prior art which have been developed for the fulfillment of countless objectives and requirements.

Known prior art handling implements include U.S. Pat. No. 5,188,409; U.S. Pat. No. 4,659,125; U.S. Pat. No. 5,228,539; U.S. Pat. No. 3,922,026; and U.S. Pat. No. Des. 349,739.

While these devices fulfill their respective, particular objectives and requirements, the aforementioned patents do not disclose a remote grapple for retrieving an object from a floor surface which includes a handle tube having a fixed handle and a moving handle projecting therefrom, and an engaging assembly extending from the handle tube and including a plurality of fingers responsive to a movement of the moving handle to close about a bar of a soap so as to retrieve the soap from a shower floor.

In these respects, the remote grapple according to the present invention substantially departs from the conventional concepts and designs of the prior art, and in so doing provides an apparatus primarily developed for the purpose of retrieving an object from a floor surface.

SUMMARY OF THE INVENTION

In view of the foregoing disadvantages inherent in the known types of handling implements now present in the prior art, the present invention provides a new remote grapple construction wherein the same can be utilized for remotely facilitating grasping of an object to retrieve the same from a floor surface. As such, the general purpose of the present invention, which will be described subsequently in greater detail, is to provide a new remote grapple apparatus and method which has many of the advantages of the handling implements mentioned heretofore and many novel features that result in a remote grapple which is not anticipated, rendered obvious, suggested, or even implied by any of the prior art handling implements, either alone or in any combination thereof.

To attain this, the present invention generally comprises a grapple for retrieving an object from a floor surface. The inventive device includes a handle tube having a fixed handle and a moving handle projecting therefrom. An engaging assembly extends from the handle tube and includes a plurality of fingers responsive to a movement of the moving handle to close about a bar of soap to retrieve the soap from a shower floor.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new remote grapple apparatus and method which has many of the advantages of the handling implements mentioned heretofore and many novel features that result in a remote grapple which is not anticipated, rendered obvious, suggested, or even implied by any of the prior art handling implements, either alone or in any combination thereof.

It is another object of the present invention to provide a new remote grapple which may be easily and efficiently manufactured and marketed.

It is a further object of the present invention to provide a new remote grapple which is of a durable and reliable construction.

An even further object of the present invention is to provide a new remote grapple which is susceptible of a low cost of manufacture with regard to both materials and labor, and which accordingly is then susceptible of low prices of sale to the consuming public, thereby making such remote grapples economically available to the buying public.

Still yet another object of the present invention is to provide a new remote grapple which provides in the apparatuses and methods of the prior art some of the advantages thereof, while simultaneously overcoming some of the disadvantages normally associated therewith.

Still another object of the present invention is to provide a new remote grapple for retrieving an object from a floor surface.

Yet another object of the present invention is to provide a new remote grapple which includes a handle tube having a fixed handle and a moving handle projecting therefrom, and an engaging assembly extending from the handle tube and including a plurality of fingers responsive to a movement of the moving handle to close about a bar of a soap so as to retrieve the soap from a shower floor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an elevation view of a remote grapple according to the present invention.

FIG. 2 is a bottom plan view of a portion of the invention taken from line 2—2 of FIG. 1.

FIG. 3 is an end elevation view of an engaging means comprising a portion of the invention.

FIG. 4 is a cross sectional view taken along line 4—4 of FIG. 3.

DESCRIPTION OF THE PREFERRED EMBODIMENT

Figure 5:
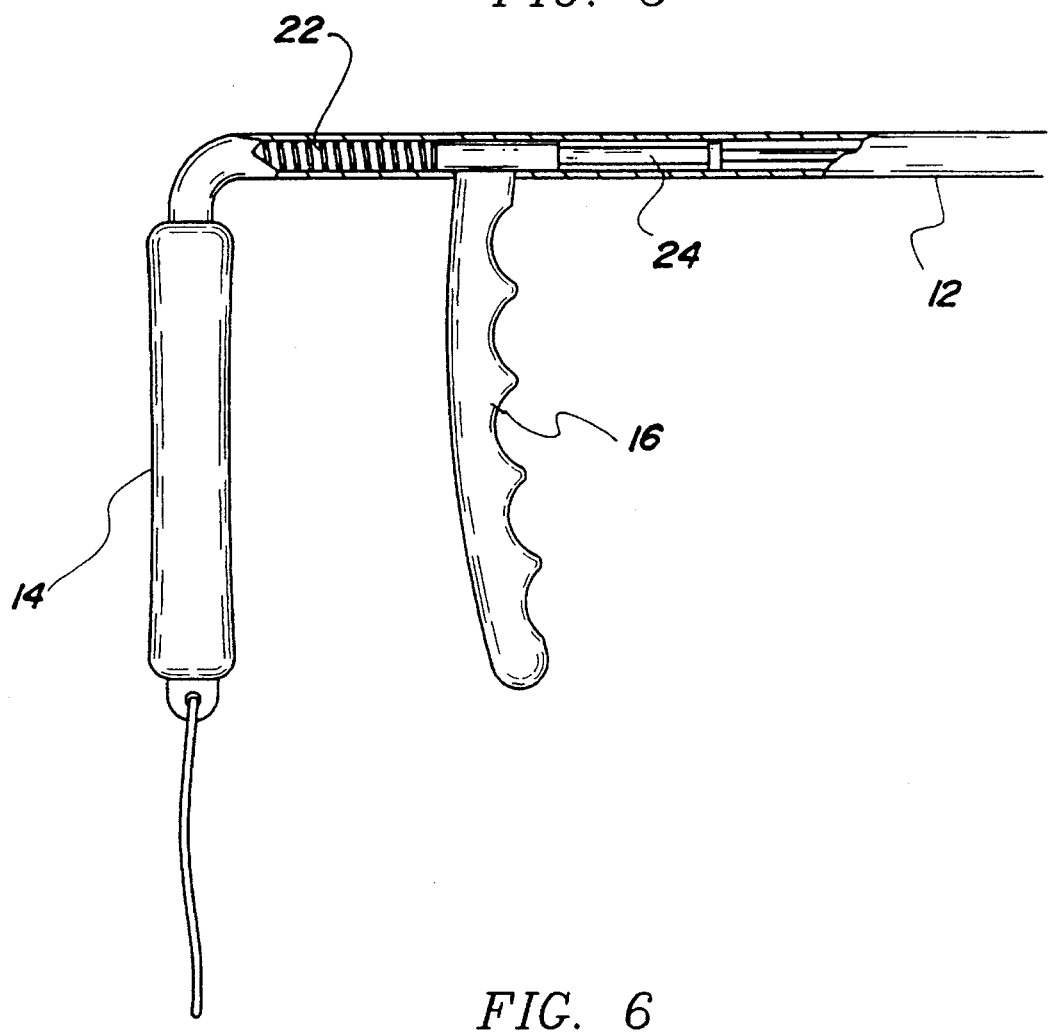
FIG. 5 is an elevation, partially in cross section, of a portion of the present invention.

With reference now to the drawings, and in particular to FIGS. 1–6 thereof, a new remote grapple embodying the principles and concepts of the present invention and generally designated by the reference numeral 10 will be described.

More specifically, it will be noted that the remote grapple 10 comprises an elongated handle tube 12 having a fixed handle 14 projecting therefrom for permitting manual manipulation of the device 10 during use thereof. A moving handle 16 is movably mounted relative to the handle tube 12 and can be manually actuated to move towards the fixed handle 14, as shown in FIG. 1 of the drawings. An engaging means 18 is mounted to the handle tube 12 and includes a plurality of engaging fingers 20 responsive to a movement of the moving handle 16 for engaging an object along radially spaced exterior portions of the object to permit manual manipulation of the object with the handle tube 12. By this structure, an individual residing within a shower or other bathing enclosure can facilitate retrieval of a bar of soap from a floor of the shower.

As best illustrated in FIGS. 2 and 5, it can be shown that the moving handle 16 is slidably mounted within an elongated slot directed through the handle tube 12. A return spring 22 is positioned within the handle tube 12 and operates to bias the moving handle 16 from the fixed handle 14. A center cable 24 is coupled to the moving handle 16 and extends through the handle tube 12 to the engaging means 18. By this structure, an individual sliding the moving handle 16 towards the fixed handle 14 can effect selective operation of the engaging means 18 during use of the device 10.

Figure 6:
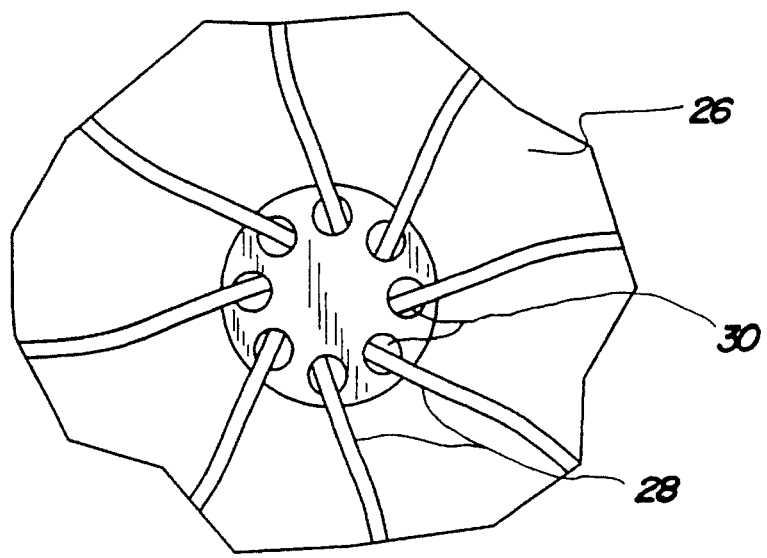
FIG. 6 is a cross sectional view taken along line 6—6 of FIG. 4.

Referring now to FIGS. 3 through 6 wherein the engaging means 18 of the present invention 10 is illustrated in detail, it can be shown that the engaging means preferably comprises a mounting head 26 secured to an end of the handle tube 12 and projecting therefrom. The engaging fingers 20 are each pivotally mounted to the mounting head 26 and positioned in a radially spaced orientation relative to one another. A plurality of finger cables 28 are coupled to the center cable 24 and project through guide apertures 30 formed in the mounting head 26 as shown in FIG. 6 of the drawings. The finger cables 28 each extend from the center cable 24 to couple with an individual one of the engaging fingers 20. By this structure, a tensioning of the center cable 24 will pull the finger cables 28 to cause a pivoting of the engaging fingers 20 towards a center longitudinal axis of the device 10 directed through the handle tube 12. To facilitate pivoting of the engaging fingers 20 back into an open orientation subsequent to releasing of tension on the center cable 24, a plurality of return springs 32 are coupled between the mounting head 26 and the engaging fingers 20 as shown in FIG. 4 of the drawings. By this structure, the engaging fingers 20 can be selectively biased radially inward to effect grasping of an object as desired by an end user.

With continuing reference to FIGS. 3 and 4, it can be shown that the present invention 10 preferably further comprises an abutment plate 34 mounted between the engaging fingers 20 and supported relative to the mounting head 26 by an abutment plate stanchion 36. The abutment plate 34 thus operates to engage an upper surface of an object being grasped by the device 10 from a floor surface.

FIG. 4 further illustrates that each of the engaging fingers 20 is preferably formed of an inner portion 38 pivotally mounted to the mounting head 26 and extending therefrom to terminate in a distal end whereat an outer portion 40 is mounted so as to extend from the inner portion 38 at an oblique angle relative thereto. By this structure, the outer portion 40 of each engaging finger 20 operates to extend beneath an object during grasping thereof by the engaging means 18 during use of the device 10.

In use, the remote grapple 20 of the present invention can be easily utilized to effect remote retrieving of an object from a floor surface. The present invention 10 is preferably constructed of non-ferrous material such as aluminum or plastic, thereby permitting use of the device 10 in wet or humid environment such as a shower without risking corrosion of the components of the invention.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A remote grapple comprising: an elongated handle tube having a fixed handle projecting from a first end thereof; a moving handle movably mounted relative to the handle tube;

an engaging means mounted to a second end of the handle tube and including a plurality of engaging fingers responsive to a movement of the moving handle for engaging an object along radially spaced exterior portions of the object to permit manual manipulation of the object with the handle tube, wherein the handle tube includes an elongated slot directed therethrough, with the moving handle being slidably mounted within the elongated slot; and further comprising a return spring positioned within the handle tube and biasing the moving handle from the fixed handle, and further comprising a center cable coupled to the moving handle and extending through the handle tube to the engaging means, wherein the engaging means comprises a mounting head secured to the second end of the handle tube and projecting therefrom, the engaging fingers each being pivotally mounted to the mounting head and positioned in a radially spaced orientation relative to one another; a plurality of finger cables coupled to the center cable and project through guide apertures formed in the mounting head, the finger cables each extending from the center cable to couple with an individual one of the engaging fingers, wherein a tensioning of the center cable will pull the finger cables to cause a pivoting of the engaging fingers towards a center longitudinal axis of the handle tube.

2. The remote grapple of claim 1, wherein the engaging means further comprises a plurality of return springs coupled between the mounting head and the engaging fingers.

3. The remote grapple of claim 2, and further comprising an abutment plate mounted between the engaging fingers and supported relative to the mounting head.

4. The remote grapple of claim 3, wherein the abutment plate is supported relative to the mounting head by an abutment plate stanchion extending from the mounting head.

5. The remote grapple of claim 4, wherein each of the engaging fingers includes an inner portion pivotally mounted to the mounting head and extending therefrom to terminate in a distal end; and an outer portion mounted so as to extend from outer distal end of the inner portion at an oblique angle relative thereto.

* * * * *